United States Patent Office 3,816,480
Patented June 11, 1974

3,816,480
3-OXYGENATED 21-DIALKYLAMINO-20-METHYL-5α-PREGN-17(20)-DIEN-3-ONES AND CONGENERS
George R. Lenz, Glenview, Ill., assignor to
G. D. Searle & Co., Chicago, Ill.
No Drawing. Filed July 30, 1973, Ser. No. 383,526
Int. Cl. C07c *169/22*
U.S. Cl. 260—397.1          14 Claims

ABSTRACT OF THE DISCLOSURE

Preparation of 3-oxygenated 21-dialkylamino-20-methyl - 5α - pregn - 17(20) - dien-3-ones and congeners, and the valuable antibiotic properties thereof, are disclosed.

---

This invention relates to 3-oxygenated 21-dialkylamino-20 - methyl - 5α - pregn - 17(20) - diene - 3 - ones and congeners, and to processes for the preparation thereof. More particularly, this invention provides chemical compounds of the formula

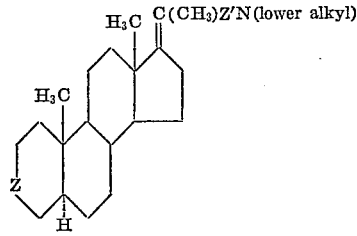

wherein Z represents β-(lower alkanoyloxy)methylene, β-hydroxymethylene, or carbonyl, and Z' represents methylene or carbonyl.

By "lower alkyl" is meant methyl, ethyl, propyl, isopropyl, butyl, isobutyl, sec.-butyl, tert.-butyl, phenyl, neopentyl, hexyl isohexyl, heptyl, and like monovalent, saturated, acyclic, straight- or branched-chain, hydrocarbon groupings of the formula $$-C_nH_{2n+1}$$

wherein n represents a positive integer less than 8. "Lower alkanoyloxy" as used herein designates a radical of the formula

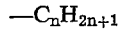
lower alkyl-C—O—

Equivalent to the basic amines comprehended hereby (compounds of the introductory formula in which Z' represents methylene) for the purposes of this invention are corresponding acid addition salts having the formula

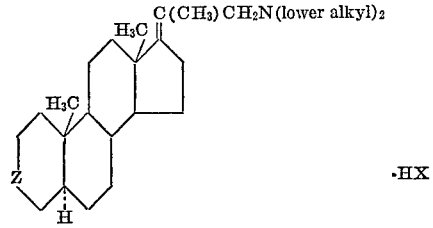

wherein Z is defined as before and X represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like— which, in combination with the cationic portion of a salt aforesaid, is neither biologically nor otherwise undesirable.

The amines to which this invention relates (including the aforesaid acid addition salts) are useful by reason of their valuable and various antibiotic activity. This activity includes the capacity to inhibit the growth of bacteria such as *Bacillus subtilis* and Erwinia sp.; protozoa such as *Trichomonas vaginalis;* fungi such as *Trichophyton mentagrophytes, Candida albicans, Fusarium* sp., and *Verticillium albo-atrum;* and algae such as *Chlorella vulgaris.*

The amides to which this invention relates (compounds of the introductory formula in which Z' represents carbonyl) are useful both as intermediates to the congeneric amines and as antibacterial agents. They share, for example, the capacity of the aforesaid amines to inhibit the growth of *Bacillus subtilis.*

Standardized tests for the foregoing antibiotic activity are described in U.S. 3,682,951. 21-Diethylamino-20-methyl - 5α - pregn - 17(20) - en - 3 - one hydrochloride, the product of Example 11 hereinafter, was found active in these tests at 10 mcgm. per ml. against *T. mentagrophytes, C. albicans, V. albo-atrum,* and *C. vulgaris;* at 100 mcgm. per ml. against *B. subtilis* and Erwinia sp.; and at 1000 mcgm. per ml. against *T. vaginalis* and Fusarium sp. 3β - Acetoxy - 21 - diethylamino - 20 - methyl - 5α - pregn-17(20)ene hydrochloride, the product of Example 10(B), and 21 - diethylamino - 20 - methyl - 5α - pregn - 17(20)-en-3-ol hydrochloride monohydrate, the product of Example 9(A), were especially potent in respect of Erwinia sp. and *C. vulgaris,* respectively, being active at 1 mcgm. per ml. in the tests referred to. N,N - Diethyl - 3β - hydroxy - 5α - pregn - 17(20) - ene - 20 - carboxamide and N,N-diethyl - 3 - oxo - 5α - pregn - 17(20) - ene-20-carboxamide, the products of Examples 5 and 7, respectively, were found to have about the same order of activity versus *B. subtilis* as 21-diethylamino - 20 - methyl - 5α-pregn-17(20)-en-3-one hydrochloride.

Those skilled in the art will recognize that observations of activity in standardized tests for particular biological effects are fundamental to the development of valuable new drugs, both veterinary and human.

The compounds of this invention can be prepared as follows: A 3β-(lower alkanoyloxy)-5α-androstan-17-one is contacted with an N,N-di(lower alkyl)-1-propynylamine in the presence of boron trifluoride etherate and dioxane, affording a 3β-(lower alkanoyloxy)-N,N-di-(lower alkyl)-5α-pregn-17(20)-ene-20-carboxamide. The ester linkage is cleaved by contacting with aqueous methanolic potassium carbonate, and the resultant 3β-hydroxy-N,N-di(lower alkyl) - 5α - pregn-17(20)-ene-20-carboxamide is oxidized via acetonic Jones reagent (a mixture of chromium trioxide, sulfuric acid, and water) to an N,N - di(lower alkyl)-3-oxo-5α-pregn-17(20)-ene-20-carboxamide. The 3-keto group in the latter compound is protected by condensation with triethyl orthoformate in the presence of p-toluenesulfonic acid monohydrate and dioxane, the resultant 3-ethoxy-N,N-di(lower alkyl)-5α-pregna-3,17(20)-diene - 20 - carboxamide is heated with lithium tetrahydroaluminate(1-) in tetrahydrofuran whereby the amidic oxygen is reduced, and the 21-di-(lower alkyl)amino-3-ethoxy - 20 - methyl-5α-pregn-3,17(20)-diene thus obtained is converted to a 21-di(lower alkyl)amino - 20 - methyl-5α-pregn-17(20)-en-3-one by heating with aqueous hydrochloric acid. From a 3β-(lower alkanoyloxy) - N,N - di(lower alkyl)-5α-pregn-17(20)-ene-20-carboxamide, on heating in dioxane with lithium tetrahydroaluminate(1-), a 21-di(lower alkyl)amino-20-methyl-5α-pregn-17(20)-en-3β-ol eventuates. Contacting such 3β-ol in a mixture of chloroform and pyridine with an anhydride of the formula (lower alkanoyl)$_2$O affords a 21-di(lower alkyl)amino-3β-(lower alkanoyloxy)-20-methyl-5α-pregn-17(20)-ene.

The basic amines of this invention are converted to the equivalent acid addition salts hereof by admixture with 1 equivalent of any of various inorganic and strong organic acids wherein the anion is defined by X above. The salts, in turn, are reconverted to the basic amines upon contacting with excess alkali.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3β-acetoxy-N,N-dimethyl-5α-pregn-17(20)-ene-20-carboxamide

To a solution of 50 parts of 3β-acetoxy-5α-androstan-17-one and 3 parts of boron trifluoride etherate in 100 parts of dioxane is added, with stirring, a solution of 25 parts of N,N-dimethyl-1-propynylamine in 50 parts of dioxane. The reaction mixture becomes very hot and turns red. When the heat abates, solvent is removed by vacuum distillation; the residue is taken up in benzene; and the benzene solution is chromatographed on silica, using benzene and mixtures thereof with increasing amounts of ethyl acetate as developing solvents. From an eluate comprising 5% ethyl acetate in benzene, on evaporation of solvent, 3β-acetoxy - N,N - dimethyl-5α-pregn-17(20)-ene-20-carboxamide is obtained as the residue. The product has the formula

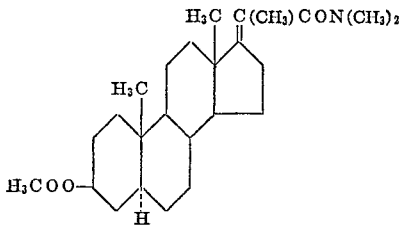

EXAMPLE 2

3β-acetoxy-N,N-diethyl-5α-pregn-17(20)-ene-20-carboxamide

To a solution of 50 parts of 3β-acetoxy-5α-androstan-17-one and 3 parts of boron trifluoride etherate in 100 parts of dioxane is added, with stirring, a solution of 25 parts of N,N-diethyl-1-propynylamine in 15 parts of dioxane. Stirring is continued for ½ hour following this addition, whereupon a further 20 parts of N,N-diethyl-1-propynylamine and 5 parts of boron trifluoride etherate are consecutively introduced. Heat is evolved and the reaction mixture becomes dark red. Solvent is removed by vacuum distillation; the residue is taken up in benzene; and the benzene solution is chromatographed on silica gel, using benzene and mixtures thereof with increasing amounts of ethyl acetate as developing solvents. From an eluate comprising 5% ethyl acetate in benzene, on evaporation of solvent, 3β-acetoxy-N,N-diethyl-5α-pregn-17(20)-ene-20-carboxamide melting at 142–144° is obtained as the residue.

EXAMPLE 3

N,N-Diethyl-3β-propionyloxy-5α-pregn 17(20)-ene-20-carboxamide

To a solution of 50 parts of 3β-propionyloxy-5α-androstan-17-one and 3 parts of boron trifluoride etherate in 100 parts of dioxane is added, with stirring, a solution of 25 parts of N,N-diethyl-1-propynylamine in 50 parts of dioxane. Stirring is continued for ½ hour after this addition is complete, whereupon a further 5 parts of boron trifluoride etherate and 20 parts of N,N-diethyl-1-propynylamine are consecutively introduced. Solvent is then removed by vacuum distillation and the residue is taken up in benzene. The benzene solution is chromatographed on silica gel, using benzene and mixtures thereof with increasing amounts of ethyl acetate as developing solvents. From an eluate comprising 5% of ethyl acetate in benzene, on evaporation of solvent, N,N-diethyl-3β-propionyloxy-5α-pregn-17(20)-ene-20-carboxamide is obtained as the residue.

EXAMPLE 4

3β-Hydroxy-N,N-dimethyl-5α-pregn-17(20)-ene-20-carboxamide

To a solution of 5 parts of 3β-acetoxy-N,N-dimethyl-5α-pregn-17(20)-ene - 20 - carboxamide in 100 parts of methanol is added 20 parts of aqueous 25% potassium carbonate. The resultant mixture is stirred at room temperatures overnight, then extracted with chloroform. The chloroform extract is washed with water, dried over anhydrous sodium sulfate, and stripped of solvent by vacuum distillation. The residue is 3β-hydroxy-N,N-dimethyl-5α-pregn-17(20)-ene-20-carboxamide.

EXAMPLE 5

N,N-Diethyl-3β-hydroxy-5α-pregn-17(20)-ene-20-carboxamide

A solution of 5 parts of 3β-acetoxy-N,N-diethyl-5α-pregn-17(20)-ene-20-carboxamide in a mixture of 20 parts of aqueous 25% potassium carbonate with 100 parts of methanol is stirred overnight, then poured into 100 parts of chloroform. The chloroform phase is separated, and the aqueous phase is washed with an additional 100 parts of chloroform. The two chloroform solutions are combined and washed with water, then dried over anhydrous sodium sulfate, and finally stripped of solvent by vacuum distillation. The residue, crystallized from a mixture of ethyl acetate and petroleum ether, is N,N-diethyl-3β-hydroxy-5α-pregn-17(20)-ene - 20 - carboxamide melting at 203–205°.

EXAMPLE 6

N,N-Dimethyl-3-oxo-5α-pregn-17(20)-ene-20-carboxamide

To a solution of 1 part of 3β-hydroxy-N,N-dimethyl-5α-pregn-17(20)-ene-20-carboxamide in 100 parts of acetone is added 1 part of Jones reagent (a mixture prepared by dissolving approximately 133 parts of chromium trioxide in 250 parts of water and consecutively adding 196 parts of concentrated sulfuric acid and water q.s. 500 ml.). Excess reagent is quenched with 2-propanol, and to the resultant solution is added 500 parts of water. Acetone is removed by vacuum distillation, whereupon N,N-dimethyl-3-oxo-5α-pregn-17(20)-ene - 20 - carboxamide precipitates in the distilland. The product is isolated by filtration and dried in air.

EXAMPLE 7

N,N-Diethyl-3-oxo-5α-pregn-17(20)-ene-20-carboxamide

To a solution of 1 part of N,N-diethyl-3β-hydroxy-5α-pregn-17(20)-ene-20-carboxamide in 100 parts of acetone is added 1 part of Jones reagent. Excess reagent is quenched with 2-propanol, and to the resultant green solution is added 500 parts of water. Acetone is removed by vacuum distillation, whereupon N,N-diethyl - 3 - oxo-5α-pregn-17(20)-ene-20-carboxamide precipitates in the distilland. The product, isolated by filtration and dried in air, is obtained thus as colorless crystals melting at 137–140°.

EXAMPLE 8

21-Dimethylamino-20-methyl-5α-pregn-17(20)-en-3β-ol hydrochloride

To a solution of 5 parts of 3β-acetoxy-N,N-dimethyl-5α-pregn-17(20)-ene-20-carboxamide in 150 parts of tetrahydrofuran is added 3 parts of lithium tetrahydroaluminate(1-). The resultant mixture is heated at the boiling point under reflux overnight, whereupon 10 parts of ethyl acetate is introduced. The mixture thus obtained is partitioned between 1000 parts of 5% hydrochloric acid and 2000 parts of chloroform. The chloroform phase is separated, dried over anhydrous sodium sulfate, and stripped of solvent by vacuum distillation. The residue is 21-dimethylamino - 20 - methyl-5α-pregn-17(20)-en-3β-ol hydrochloride, which is further purified by trituration with boiling ethyl acetate. The product has the formula

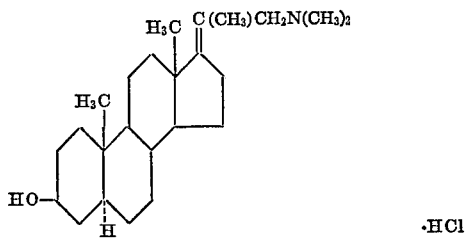

EXAMPLE 9

(A) 21-Diethylamino-20-methyl-5α-pregn-17(20)-en-3β-ol hydrochloride monohydrate To a solution of 5 parts of 3β-acetoxy-N,N-diethyl-5α-pregn-17(20)-ene-20-carboxamide in 150 parts of tetrahydrofuran is carefully added 3 parts of lithium tetrahydroaluminate(1-). The resultant solution is heated at the boiling point overnight, whereupon 5 parts of ethyl acetate is introduced. The mixture thus obtained is partitioned between 1000 parts of 5% hydrochloric acid and 2000 parts of chloroform. The chloroform phase is separated, dried over anhydrous sodium sulfate, and stripped of solvent by vacuum distillation. The residue is 21-diethylamino-20-methyl-5α-pregn-17(20)-en - 3β - ol hydrochloride monohydrate which, further purified by trituration with boiling ethyl acetate, is obtained as colorless crystals melting at approximately 265–266°.

(B) 21-Diethylamino-20-methyl-5α-pregn-17(20)-en-3β-ol

To a solution of 1 part of 21-diethylamino-20-methyl-5α-pregn-17(20)-en-3β-ol hydrochloride monohydrate in 100 parts of water is added 5 parts of potassium carbonate. The resultant mixture is extracted with 100 parts of chloroform. The chloroform extract is dried over anhydrous sodium sulfate and stripped of solvent by vacuum distillation. The residue is 21-diethylamino-20-methyl-5α-pregn-17(20)-en-3β-ol which, crystallized from aqueous 10% methanol, is obtained as colorless crystals melting at 148–150°.

EXAMPLE 10

(A) 3β-Acetoxy-21-diethylamino-20-methyl-5α-pregn-17(20)-ene

To a solution of 1 part of 21-diethylamino-20-methyl-5α-pregn-17(20)-en-3β-ol in 10 parts of chloroform is added 8 parts of acetic anhydride and 10 parts of pyridine. The resultant mixture is allowed to stand at room temperatures overnight, whereupon 25 parts of methanol is introduced. Solvents are then removed by vacuum distillation, and to the residue is consecutively added 100 parts of water and 5 parts of potassium carbonate. Insoluble solids are filtered out and taken up in ethyl acetate. The ethyl acetate solution is treated with decolorizing charcoal, filtered, and stripped of solvent by vacuum distillation. The residue is 3β-acetoxy-21-diethylamino-20-methyl-5α-pregn-17(20)-ene which, recrystallized from methanol, is obtained as colorless crystals melting at 131–133°.

(B) 3β-Acetoxy-21-diethylamino-20-methyl-5α-pregn-17(20)-ene hydrochloride

To a solution of 1 part of 3β-acetoxy-21-diethylamino-20-methyl-5α-pregn-17(20)-ene in 100 parts of chloroform is added 100 parts of 5% hydrochloric acid. The resultant mixture is stirred and then separated into the two component phases. The aqueous phase is extracted with 700 parts of chloroform, and this extract is combined with the original chloroform phase. The resultant solution is dried over anhydrous sodium sulfate and stripped of solvent by vacuum distillation. The residual oil is added to 25 parts of boiling ethyl acetate, from which 3β-acetoxy-21-diethylamino - 20 - methyl-5α-pregn-17(20)-ene hydrochloride crystallizes as it cools. The product melts at 230–233°.

EXAMPLE 11

21-Diethylamino-20-methyl-3β-propionyloxy-5α-pregn-17(20)-ene

A mixture of 1 part of 21-diethylamino-20-methyl-5α-pregn-17(20)-en-3β-ol, 8 parts of propionic acid anhydride, 10 parts of pyridine, and 10 parts of chloroform is allowed to stand at room temperatures overnight, whereupon 100 parts of methanol is introduced. Solvent is removed by vacuum distillation, and the residue is taken up in 100 parts of water. To the aqueous solution is added 5 parts of potassium carbonate. The precipitate which forms is 21-diethylamino-20-methyl-3β-propionyloxy-5α-pregn-17(20)-ene, which is isolated by filtration and dried in air.

EXAMPLE 12

21-Dimethylamino-20-methyl-5α-pregn-17(20)-en-3-one hydrochloride

To a solution of 12 parts of N,N-dimethyl-3-oxo-5α-pregn-17(20)-ene-20-carboxamide and 20 parts of triethyl orthoformate in 60 parts of dioxane and 32 parts of absolute ethanol at 0° is added approximately 1 part of p-toluenesulfonic acid monohydrate. The resultant solution is stirred for ½ hour, whereupon 8 parts of pyridine is added and the solution thus obtained is poured into 4000 parts of water. The suspension which eventuates is extracted with 800 parts of benzene. The benzene extract is dried over anhydrous sodium sulfate and stripped of solvent by vacuum distillation. The residue is taken up in 400 parts of tetrahydrofuran, and to this solution is carefully added 12 parts of lithium tetrahydroaluminate(1-). The resultant mixture is heated at the boiling point under reflux overnight, whereupon 40 parts of ethyl acetate is introduced. The mixture thus obtained is poured into 4000 parts of 5% hydrochloric acid; and the resultant mixture is extracted with 4000 parts of chloroform. The chloroform extract is dried over anhydrous sodium sulfate and stripped of solvent by vacuum distillation. The residue is 21-dimethylamino - 20 - methyl-5α-pregn-17(20)-en-3-one hydrochloride.

EXAMPLE 13

21-Diethylamino-20-methyl-5α-pregn-17(20)-en-3-one hydrochloride

Substitution of 12 parts of N,N-diethyl-3-oxo-5α-pregn-17(20)-ene-20-carboxamide for the N,N-dimethyl-3-oxo-5α-pregn-17(20)-ene-20-carboxamide called for in Example 12 affords, by the procedure there detailed, 21-diethylamino - 20-methyl-5α-pregn-17(20)-en-3-one hydrochloride. The product, upon recrystallization from ethyl acetate, melts at 221–226°.

What is claimed is:
1. A compound of the formula

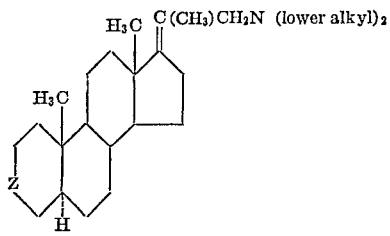

wherein Z represents β-(lower alkanoyloxy)methylene, β-hydroxymethylene, or carbonyl.

2. A compound according to claim 1 having the formula

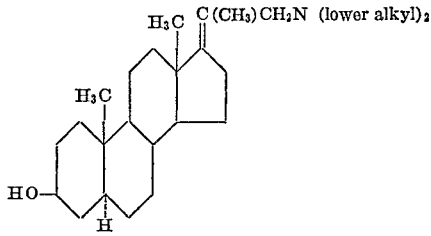

3. A compound according to claim 1 which is 21-diethylamino-20-methyl-5α-pregn-17(20)-en-3β-ol.
4. A compound according to claim 1 having the formula

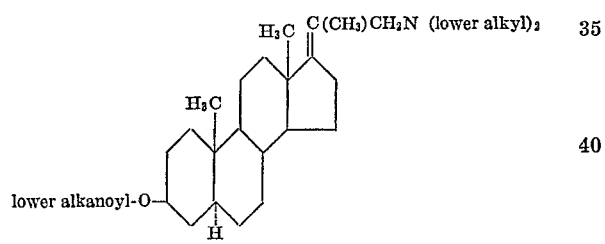

5. A compound according to claim 1 which is 3β-acetoxy-21-diethylamino-20-methyl-5α-pregn-17(20)-ene.
6. A compound according to claim 1 having the formula

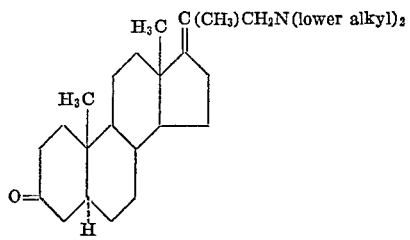

7. A compound according to claim 1 which is 21-diethylamino-20-methyl-5α-pregn-17(20)-en-3-one.

8. A compound of the formula

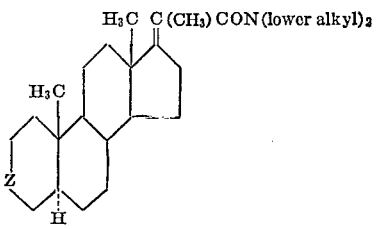

wherein Z represents β-(lower alkanoyloxy)methylene, β-hydroxymethylene, or carbonyl.

9. A compound according to claim 8 having the formula

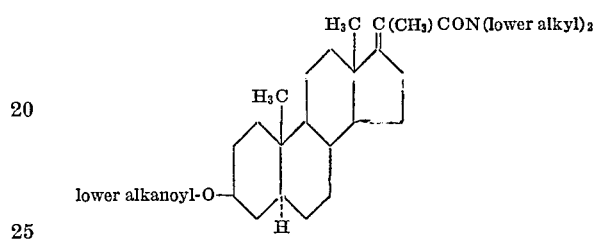

10. A compound according to claim 8 which is 3β-acetoxy-N,N-diethyl - 5α - pregn-17(20)-ene-20-carboxamide.
11. A compound according to claim 8 having the formula

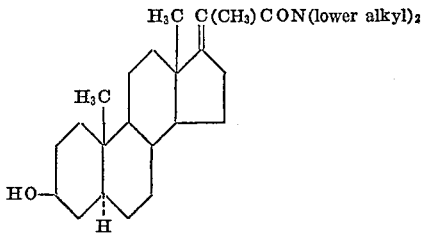

12. A compound according to claim 8 which is N,N-diethyl-3β-hydroxy-5α-pregn-17(20)-ene-20-carboxamide.
13. A compound according to claim 8 having the formula

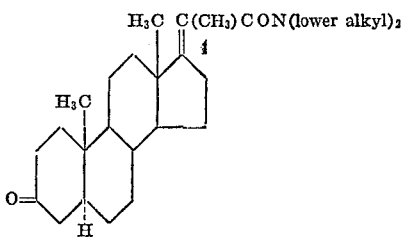

14. A compound according to claim 8 which is N,N-diethyl-3-oxo-5α-pregn-17(20)-ene-20-carboxamide.

No references cited.

HENRY A. FRENCH, Primary Examiner

U.S. Cl. X.R.
260—397.3, 397.5, 999